(12) United States Patent
Ho

(10) Patent No.: US 10,285,251 B2
(45) Date of Patent: May 7, 2019

(54) GROUNDING DEVICE

(71) Applicant: EQUIVOLT M PTE LTD, Singapore (SG)

(72) Inventor: Wei Chon Alvin Ho, Singapore (SG)

(73) Assignee: EQUIVOLT M PTE LTD, Singapore (SG)

( * ) Notice: Subject to any disclaimer, the term of this patent is extended or adjusted under 35 U.S.C. 154(b) by 0 days.

(21) Appl. No.: 15/747,572

(22) PCT Filed: Jul. 29, 2016

(86) PCT No.: PCT/SG2016/050372
§ 371 (c)(1),
(2) Date: Jan. 25, 2018

(87) PCT Pub. No.: WO2017/018949
PCT Pub. Date: Feb. 2, 2017

(65) Prior Publication Data
US 2018/0220516 A1    Aug. 2, 2018

Related U.S. Application Data

(60) Provisional application No. 62/198,147, filed on Jul. 29, 2015.

(51) Int. Cl.
*H01R 4/48*    (2006.01)
*H01R 4/56*    (2006.01)
(Continued)

(52) U.S. Cl.
CPC .............. *H05F 3/02* (2013.01); *H01R 4/48* (2013.01); *H01R 4/56* (2013.01); *H01R 4/66* (2013.01);
(Continued)

(58) Field of Classification Search
CPC ... H01R 4/28; H01R 4/48; H01R 4/56; H01R 4/66; H01R 4/44; H01R 4/453;
(Continued)

(56) References Cited

U.S. PATENT DOCUMENTS 2,396,901 A * 3/1946 Tiffany .............. H01R 13/4532
439/140
2,444,843 A * 7/1948 Modrey ............. H01R 13/4538
439/140
(Continued)

FOREIGN PATENT DOCUMENTS

DE    3834171 A1    4/1990
GB    850069 A      9/1960

OTHER PUBLICATIONS

International Search Report dated Oct. 4, 2016 in International Application No. PCT/SG2016/050372.

*Primary Examiner* — Edwin A. Leon
*Assistant Examiner* — Oscar C Jimenez
(74) *Attorney, Agent, or Firm* — Sterne, Kessler, Goldstein & Fox P.L.L.C.

(57) ABSTRACT

The present invention relates to a grounding device. In particular, the present invention relates to ground device, or an earth receptacle, that may be installed or fixed into a structure (e.g. placed in the ground) to provide an avenue of safe discharge for electrical current when the device is connected to a piece of equipment of vehicle. In an aspect of the present invention, there is provided a grounding device comprising: (a) a first casing having an open top; (b) a pin extending from the base of and within the first casing, the pin made from an electrically conductive material and has a longitudinal length with opposite first and second ends, the second end of the pin in contact with or integral with base of the casing; (c) a plate member having an opening to allow the plate to move along the longitudinal length of the (Continued)

SECTION A-A pin between a first position and a second position, the plate member and the frame form a cavity within the first casing; and (d) a biasing member disposed within the cavity and attached to the plate member for biasing the plate member in the first position, wherein the first position conceals the longitudinal length of the pin within the cavity and the second position is any position that exposes a portion of the longitudinal length of the pin.

18 Claims, 20 Drawing Sheets

(51) Int. Cl.
    *H01R 4/66* (2006.01)
    *H05F 3/02* (2006.01)
    *H01R 24/38* (2011.01)
    *H02G 13/00* (2006.01)
    *H01R 13/453* (2006.01)
    *B67D 7/32* (2010.01)
    *H01R 11/24* (2006.01)

(52) U.S. Cl.
    CPC ......... *H01R 13/4538* (2013.01); *H01R 24/38* (2013.01); *B67D 7/3236* (2013.01); *H01R 11/24* (2013.01); *H01R 2201/26* (2013.01); *H02G 13/40* (2013.01)

(58) Field of Classification Search
    CPC ....... H01R 4/4534; H01R 4/4538; H05F 3/02; H02G 13/40
    USPC .................................. 439/139, 141, 246, 247
    See application file for complete search history.

(56) References Cited

U.S. PATENT DOCUMENTS

| | | | | |
|---|---|---|---|---|
| 2,986,612 | A * | 5/1961 | Healy | H01R 13/4532 200/323 |
| 3,038,972 | A | 6/1962 | Lagier | |
| 3,271,725 | A * | 9/1966 | Bloch | H01R 13/453 439/141 |
| 4,203,640 | A * | 5/1980 | Bice | H01R 13/4532 439/139 |
| 4,445,739 | A * | 5/1984 | Wooten | H01R 13/4538 439/140 |
| 4,483,575 | A * | 11/1984 | Kruger | H01R 13/6215 439/102 |
| 4,808,127 | A * | 2/1989 | Swanic | H01R 13/623 439/139 |
| 4,832,613 | A * | 5/1989 | Tsukakoshi | H01R 13/631 439/141 |
| 5,167,516 | A * | 12/1992 | Tan | H01R 13/631 439/140 |
| 5,466,164 | A * | 11/1995 | Miyazaki | H01R 13/4538 439/140 |
| 6,146,168 | A * | 11/2000 | Ishii | H01R 13/7031 439/188 |
| 6,167,291 | A * | 12/2000 | Barajas | A61B 5/04286 439/909 |
| 8,011,941 | B2 * | 9/2011 | Sadick | H01R 13/52 439/271 |
| 8,075,325 | B1 * | 12/2011 | Kao | H01R 13/5227 438/141 |
| 2001/0005645 | A1 | 6/2001 | Zech et al. | |
| 2003/0176087 | A1 * | 9/2003 | Erez | H01R 13/4538 439/108 |
| 2007/0032112 | A1 | 2/2007 | Renautt et al. | |
| 2013/0248492 | A1 * | 9/2013 | Froebel | H01H 1/385 218/18 |
| 2014/0322946 | A1 * | 10/2014 | Genest | H01R 13/627 439/329 |
| 2017/0117729 | A1 * | 4/2017 | Hirose | H01R 13/629 |

\* cited by examiner

GROUNDING DEVICE

The present application claims priority from US provisional patent application No. 62/198,147 filed on 29 Jul. 2015, the entire disclosure of which is hereby incorporated by reference.

FIELD OF THE INVENTION

The present invention relates to a grounding device. In particular, the present invention relates to ground device, or an earth receptacle, that may be installed or fixed into a structure (e.g. placed in the ground) to provide an avenue of safe discharge for electrical current when the device is connected to a piece of equipment of vehicle.

BACKGROUND OF THE INVENTION

Proper earth ground is important. It is needed to reduce or eliminate static charge build-up and power surges in any piece of equipment or vehicle containing electronic equipment, including those from lightning, which can cause safety hazards, power failures, damage electronic equipment, or otherwise creates costly and inconvenient problems.

For various well-known reasons, it is commonly necessary to use grounding electrodes to provide permanent electrical connections between metal structures and the earth. The most common type of grounding electrodes are grounding rods, typically 8 to 10 feet long, that are driven completely or almost completely into the earth. Electrical connections are made from the grounding rods to the structures being grounded, using suitable electrical conductors (e.g., grounding cables). Angered grounding rods are commonly used as alternatives to driven grounding rods. An ideal grounding connection maintains zero voltage regardless of how much electrical current flows into or out of the earth. The quality of a grounding connection may be improved in a number of ways, by, e.g. increasing the surface area of grounding electrode coming into contact with the earth; increasing the depth to which the grounding rod is driven or augered (in cases where the grounding electrode is a driven or augered grounding rod); using multiple connected electrodes; increasing the moisture content of the soil surrounding the electrode(s); improving the conductive mineral content of the soil; and/or increasing the earth surface area covered by the grounding system.

Such static earth or grounding devices or receptacles, incorporating grounding rods or pins, are used in many places such as airfields and petrol stations to provide a temporary earth discharge point for planes, vehicles and other vehicles and transportation platforms. Such earth receptacle typically include a grounding pin or rod and is installed in the ground. When an aircraft or refueling vehicle is parked at a certain designated site, an earth clamp or cable is used to connect it to the grounding rod or pin that is placed within the earth receptacle so that ground lightning strikes or arcing caused by electrical issues can be safely discharged and not lead to electrocution or cause an explosion.

Existing grounding device, or earth receptacles, generally feature a hinged trap door type or with a removable cover or lid that requires the user to pry the cover open in order to access the grounding pin within the receptacle. The cover is necessary to prevent dirt and other foreign objects from getting trapped within the interior of the receptacle and it should be flushed with the surface of the ground to prevent tripping and other hazards. Over time, the spring for the hinged trap door type might break or get damaged, hence compromising the effectiveness of the receptacle and the cover. In addition, due to mishandling of the grounding device, the cover might come detached from the device and be lost.

In operation, it is fiddling for a user to pry open the cover while holding onto an earth clamp or cable with the other hand. As such, it may require additional time to set up the grounding of the equipment or vehicle. This additional time may be crucial when fast operation is necessary, e.g. quick time around times required for flights at the airport, quick operation necessary during sudden weather changes.

In addition, when the spring or the receptacle cover is damaged or lost, it can be difficult to repair it especially for the hinged trap door type. Any replacement typically requires the entire receptacle to be removed by breaking the surrounding concrete it is fixed into in order to install a new unit and this process is laborious, expensive and time consuming.

Therefore, there is a need for an improvement earth receptacle or grounding device where the grounding pin is protected from the elements within the interior of the device and yet is able to be easily accessed by a user without having to handle too many parts, and is resistant to wear and tear over multiple usage.

The listing or discussion of an apparently prior-published document in this specification should not necessarily be taken as an acknowledgement that the document is part of the state of the art or is common general knowledge.

Any document referred to herein is hereby incorporated by reference in its entirety.

SUMMARY OF THE INVENTION

In a first aspect of the present invention, there is provided a grounding device comprising: (a) a first casing having an open top; (b) a pin extending from the base of and within the first casing, the pin made from an electrically conductive material and has a longitudinal length with opposite first and second ends, the second end of the pin in contact with or integral with base of the casing; (c) a plate member having an opening to allow the plate to move along the longitudinal length of the pin between a first position and a second position, the plate member and the first casing form a cavity within the first casing; and (d) a biasing member disposed within the cavity and attached to the plate member for biasing the plate member in the first position, wherein the first position conceals the longitudinal length of the pin within the cavity and the second position is any position that exposes a portion of the longitudinal length of the pin.

Preferably, the device further comprises a stopper assembly for limiting the range of movement of the plate member. The stopper assembly may comprise: (a) a stop member attached to the surface of the plate member facing the interior wall of the first casing, a portion of the stop member protrudes from the surface; and (b) a slot in the wall of the first casing for accommodating the protruded stop member, the slot having a length parallel to the longitudinal length of the pin, wherein movement of the plate member along the longitudinal length of the pin is limited by the length of the slot.

Preferably, the length of the slot is shorter than the longitudinal length of the pin.

Preferably, the device comprises a plurality of such stopper assemblies. In an embodiment, the device comprises 3 equally spaced apart stopper assemblies.

Preferably, the pin further comprises a notch positioned at the first end for receiving a pair of jaws of a clamp.

Preferably, the biasing member is a spring mechanism.

Preferably, the pin and the first casing are integrally formed from the same electrically conductive material.

Preferably, the exterior surface of the base of the first casing further comprises a boss for providing an electrical connection with an electrical conducting material.

Preferably, in an embodiment of the present invention, the device further comprises a second outer casing, the second casing having an open top for housing the first inner casing, the first and second casings made of an electrically conductive material to provide good electrical conductivity between the first and second casings.

Preferably, the interior surface of the base of the second casing further comprises a pit for mating with the boss of the first casing.

Preferably, the device may comprise any means for allowing the device to connect with an earth grounding network. For example, the exterior surface of the base of the second casing may comprise an opening configured for receiving a connection to an earth grounding network. Alternatively, the exterior surface of the base of the second casing may comprise a tail for conducting an electrical charge to an earth grounding network.

Preferably, the second casing is fixed into a structure and the first casing is removably attached to the second casing. For example, the second casing may be a fixture that is permanently set into the ground while the first casing can be attached to or removed from the second casing. In an embodiment, the first and second casings are annular and are removably attached to each other by a screw action via opposing screw threads on the exterior surface of the first casing and on the interior surface of the second casing.

Preferably, the top of the wall of the first casing further comprising at least one hole for engaging with a tool for attaching the first casing to the second casing or removing the first casing from the second casing.

Preferably, the exterior surface of second casing further comprising splines.

Preferably, the exterior surface of the base of the second casing further comprising at least one attachment means for attaching the device to a grounding plate. In an embodiment, such attachment means may simply include any hole where the grounding plate may be secured to the device by a screw.

In a second aspect of the present invention, there is provided a ground system comprising at least one grounding device according to the first aspect of the present invention, the grounding device connected to an earth grounding network.

Advantageously, the grounding device of the present invention features several design attributes which are specifically catered to both the environmental and operational conditions where it will be used. Some of these features include:

(a) An outer casing with screw threads on the top inner surface of the cavity that secures the inner casing assembly. The outer casing may be a permanent fixture that will be embedded in the hard concrete with an attached grounding rod that is connected to the underground earth mesh or grounding strip. The external surface of the outer casing is designed with splines to provide a locking attribute in the concrete after it cures and hardens to further impede any rotational movement.

(b) An inner casing can be screwed into the outer casing via the use of a special tool. This greatly facilitates the installation and removal of the inner casing if any maintenance (e.g. cleaning), or repairs to the device is required. The inner casing has a plate member that is biased in a position that allows the top first end of the pin, top end of the wall of the casing and surface of the plate member to be flushed (or level) with the ground surface. By "flushed", it means same levels, or aligned with. When installed, this inner casing sits in the outer casing firmly with good surface contact that provides excellent electrical conductivity to discharge the electrical current. The inner casing assembly also contains a biasing member such as a spring loaded mechanism which enables a simple "press-down" motion to reveal the grounding pin for the ground cable clamp to grip on. When the "press-down" pressure is removed, the plate member of the inner casing reverts to its original state automatically through the use of the spring in order to create a flushed top surface on the ground.

(c) The components of the entire device may be made of LG2 Gun Metal which is an excellent electrically conductive material that has strong anti-corrosion properties coupled with good mechanical strength for prolonged outdoor use in challenging climates. The spring used in the device is made out of tempered stainless steel which is also highly resistant to corrosion and provides a good return spring force for prolonged usage.

BRIEF DESCRIPTION OF THE FIGURES

In order that the present invention may be fully understood and readily put into practical effect, there shall now be described by way of non-limitative examples only preferred embodiments of the present invention, the description being with reference to the accompanying illustrative figures.

In the Figures.

DETAILED DESCRIPTION OF PREFERRED EMBODIMENTS

Figure 1A:
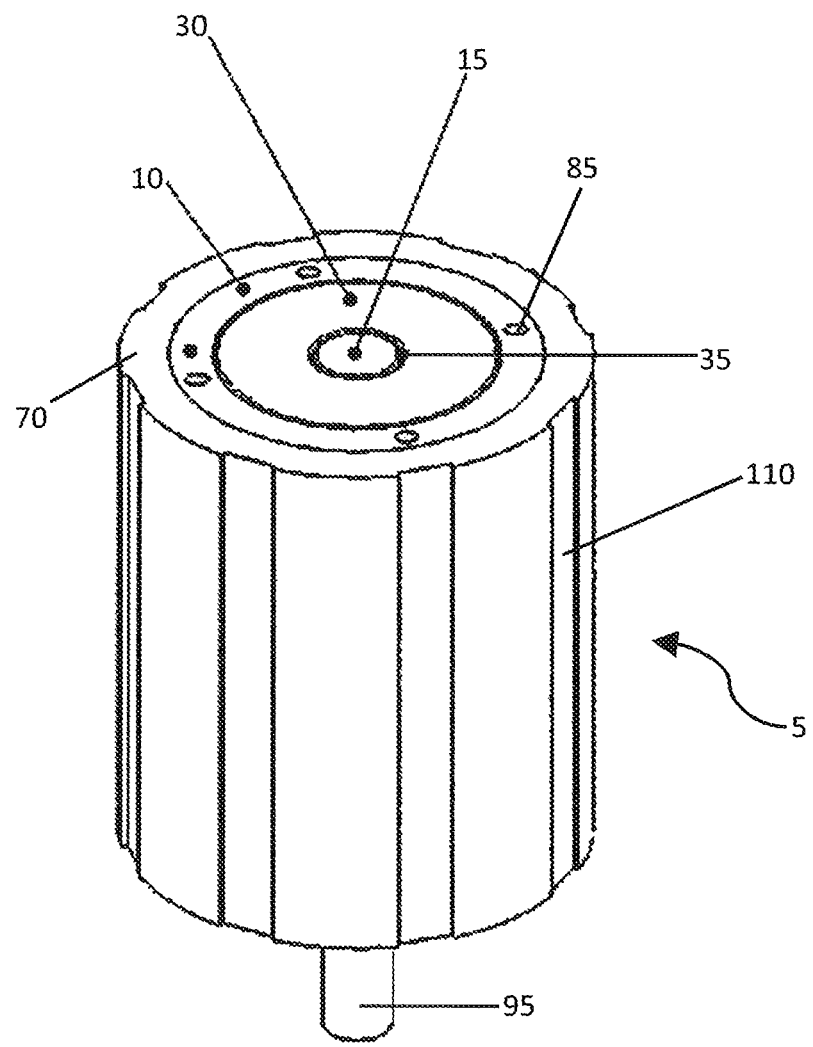
FIGS. 1a and 1b are perspective top and bottom views respectively of a grounding device according to an embodiment of the present invention.
Figure 1B:
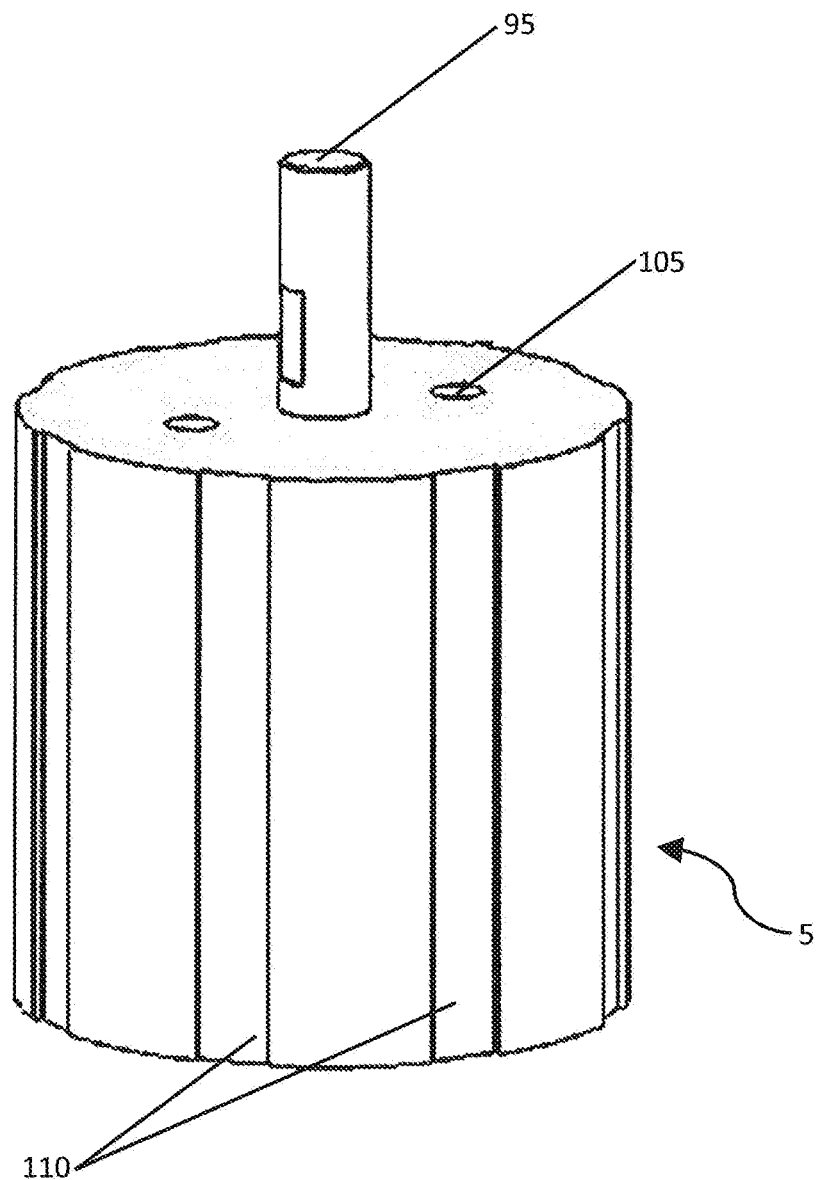

The present grounding device 5 is a plunger-type safety protection device that is installed in the hard ground that can be connected to an underground grounding system such as an earth mesh or grounding strip at one end and connected to an airplane (or any other means of transportation or piece of equipment) that is parked on the ground at the other end to create an electrically conductive path between the plane and the grounding system so that large currents can be safely discharged in the event of a lightning strike or other electrical issues. FIG. 1a shows a perspective top view of the device 5, and FIG. 1b shows a perspective bottom view of the device 5. In order to better describe the device 5 of the present invention, reference will first be made to FIG. 2b—which is a cross-sectional view of the device 5 along line AA shown in FIG. 2a.

Figure 2A:
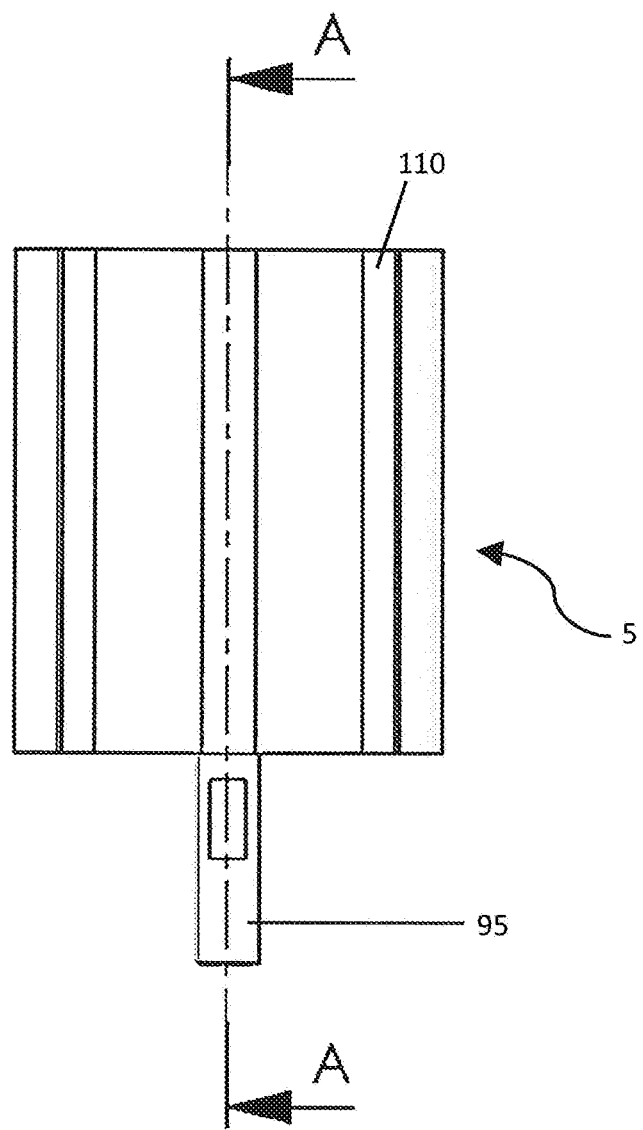
FIG. 2a is a side view of a grounding device according to an embodiment of the present invention.

In an embodiment, the present grounding device 5 has a first casing 10 having an open top. As can be seen in FIG. 2a, the first casing 10 has a U-shape cross-section having a base 12 and a wall 14. The casing 10 may be any suitable cage, housing, frame-like structure and may be of any suitable shape, e.g. angular, annular, circular, square, rectangular, triangular etc. In an embodiment, the shape is annular as shown in FIGS. 1a and 1b.

A grounding pin 15 that is typically used for grounding extends from the base 12 of and within an interior cavity of the first casing 10. The pin 15 may be made of any suitable electrically conductive material, e.g. any suitable metal and has a longitudinal length running along and parallel the wall 14 of the first casing 10. A first end 25 of the pin 15 is at the top of the device 5, while the opposite second end 20 joins at or is in contact with or is integral with the base 12 of the first casing 10. When in use, jaws from a ground cable clamp can grip or clamp onto the pin 15 in order to ground whatever equipment or vehicle the cable is connected to in the other opposite end.

Figure 2B:
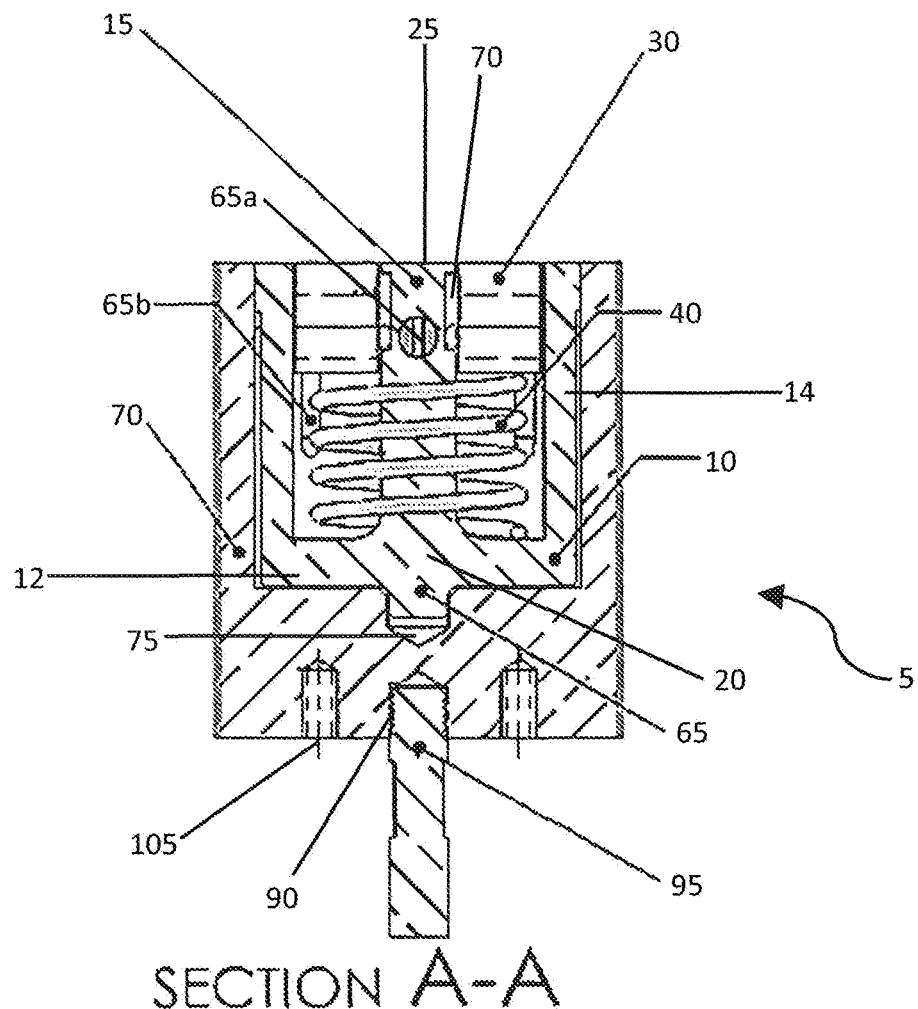
FIG. 2b is a cross-sectional view of line AA.

A plate member 30 is disposed within the cavity (interior) of the first casing 10 and is slidably movable along the longitudinal length of the pin 15, i.e. it is able to move along the longitudinal length of the pin 15 between a first position and a second position. Typically, the first position is a position at the top of the device 5 as shown in FIGS. 1a, 1b and 2b. The first position conceals the longitudinal length of the pin 15 within the cavity of the first casing 10. The second position may be a position anywhere along the longitudinal length of the pin 15 which reveals the pin 15 to allow the jaws 55 of a ground cable clamp to grip on. In particular, the second position is any position that would expose a portion of the pin 15 in order to allow a user to access it and to clamp the jaws of an earth cable onto the pin 15. The plate member 30 is able to do this because of an opening 35 or aperture from which the pin 15 can be accommodated. The opening 35 or aperture is a through-hole and may be centrally located within the plate member 30. The plate member 30 may be made of any suitable material, preferably one that is electrically conductive. The center through-hole envelopes the pin 15 with a flushed top surface when it is at the first position (the highest top position).

Within the interior cavity of the first casing 10 is a compression spring mechanism 40 which is attached to the plate member 30. The spring mechanism 40 acts as a biasing means for biasing the plate member 30 in the first position, i.e. a positive force to push the plate member 30 upwards when the device 5 is not in use. Any suitable biasing means may be used, e.g. a resilient leaf etc. The biasing member 40 will seat within the cavity of the first casing 10. The plate member 30 and the wall 14 and base 12 of the first casing 10 form a cavity within the interior of the first casing 10. Hence, when in the first position, the plate member 30 acts a cap (or cover, or lid) to enclose the interior cavity of the first casing 10, protecting the cavity and also the pin 15 from the elements, including any dust or dirt from entering the cavity.

In an embodiment, the spring mechanism is made from stainless steel grade 301 with a wire diameter of approximately 2.5 mm and an outer spring diameter of approximately 40 mm.

FIGS. 5a-d show the device 5 when it is installed into the ground 45. As such, in operation, a force to push or depress the plate member 15 into the interior cavity of the first casing 10 will expose the pin 15 allowing the pin 15 to engage an earth ground cable. For example, if the device 5 is placed in the ground, the compression spring mechanism 40 allows convenient access to the pin 15 by a simple "press-down" vertical motion (spring compressed) which automatically reverts to the original first position state when the "press-down" pressure is removed (spring uncompressed). In the present case, the force can come via the action of a pair of jaws 55 of an earth cable 60. Advantageously, this "plunger action" design provides a quick and easy way to access the pin 15 without have to pry the cover or lid open and at the same time, flushes with the ground surface level 50 when it is not in use.

The use of the device is straight forward and hassle free and should not cause any additional steps in current procedures and protocols. Once the device is installed into the ground (or wall of a building), the user or operator will only need to open the jaws 55 (slightly open) of the ground cable clamp 60 sufficiently over the flushed grounding pin head 15, 25 and depress the surrounding annulus plate member 30 downwards with the tip of the clamp jaws 55. This will expose the body or longitudinal length of the pin 15 and the operator can then close the clamp jaws 55 to grip onto it. When the other end of the ground cable 60 is attached to the relevant equipment or transportation platform (plane, car, etc.), a good electrical bond would have been created between the equipment or transportation platform (plane, car, etc.) and the device 5. Any stray electrical current caused by lightning or electrical issues from the equipment or transportation platform (plane, car, etc.) will then be safely discharged into the earth mesh or grounding strip 95, 100 through the device.

To break the electrical bond between the equipment or transportation platform (plane, car, etc.) and the device 5, the operator will only have to open the jaws 55 of the ground cable clamp 60 sufficiently and move it away and the spring force by the biasing member 40 will automatically push the plate member 30 upwards to flush against the ground level.

Figure 8:
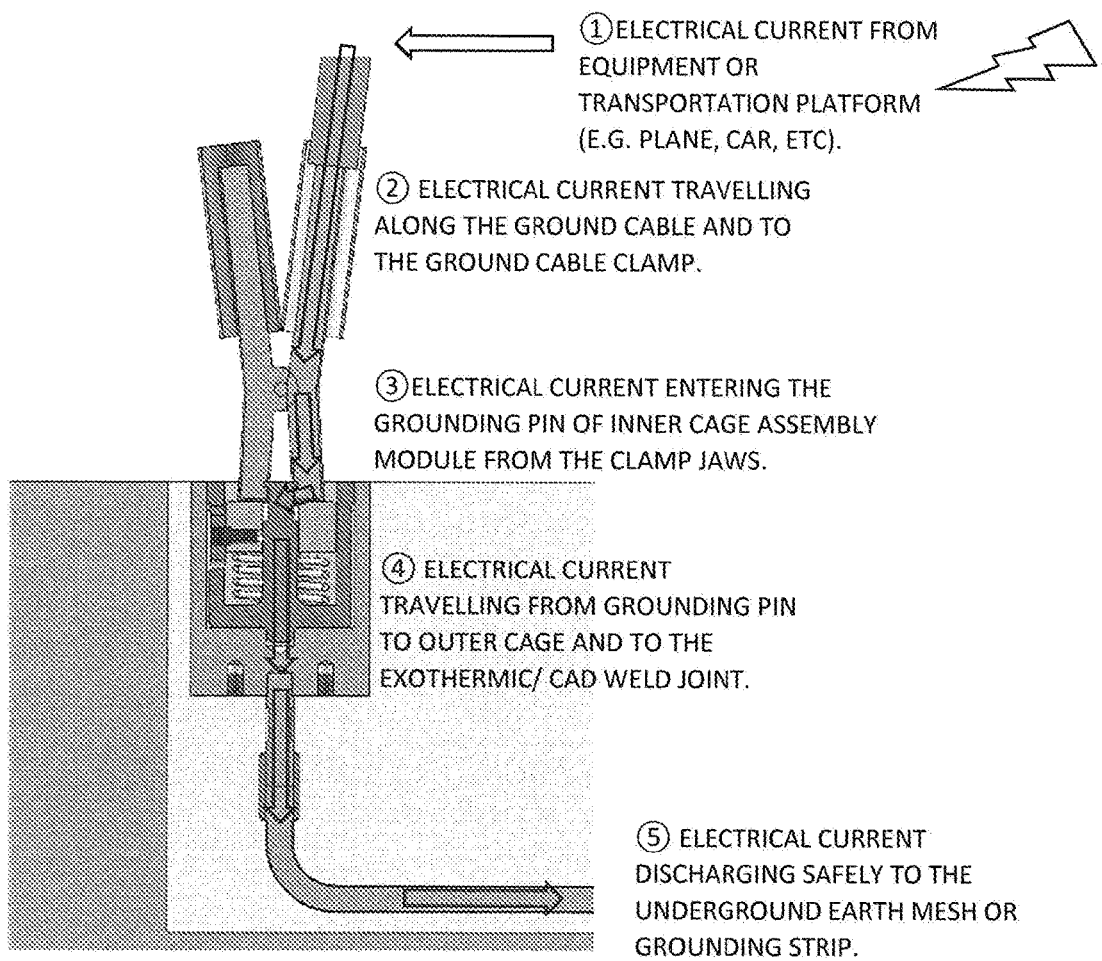
FIG. 8 shows the flow of electrical charge through a grounding device according to an embodiment of the present invention when in use.

As shown in FIG. 8, the flow of stray electrical current from the equipment or transportation platform (plane, car, etc.) when it is coupled to the device 5 should travel in the following sequence:

Equipment or transportation platform or vehicle (plane, car, etc.)→Ground cable 60→Ground cable clamp 55→Grounding pin 15 in the first inner casing 10 of the device 5→Attached grounding rod 95 of second outer casing 70 of the device 5→An exothermic joint linking to underground earth network→Underground Earth Network Mesh or Ground Strip 100.

A notch 70 adjacent the first end of the pin 15 forms a collar (or a "mushroom head") at the top of the pin 15 to allow the pin 15 to easily receive, engage and retain the jaws 55 of the earth cable 60. This is highlight in the circle shown in FIG. 5d. A corresponding groove in the jaws 55 of the earth cable 60 sits snuggly with the collar at the top first end of the pin 15. The "mushroom head" prevents the clamp jaws 55 from slipping upwards and disengaging from the grounding pin 15 unintentionally.

The pin 15 and the first casing 10 may be integrally formed from the same electrically conductive material. The first casing 10 may be connected to an earth ground network to discharge the electrical charge by any suitable means. For example, a boss 65 formed on the exterior surface of the base 12 of the first casing 10 may be used to provide an electrical connection with any electrical conducting material that forms part of an earth ground network.

It is understood that the device 5 may be installed or fixed in any location apart from the ground, e.g. in a wall of a building structure etc.

While the plate member 30 is able to slidably move along the longitudinal length of the pin 15, the first casing 10 of the device 5 may also include a stopper assembly 65*a, b* limits movement of the plate member 30 along the longitudinal length of the pin 15. The stopper assembly 65*a, b* includes a stop member 65*a* that is attached to the surface of the plate member 30 that is facing the interior wall 14 of the first casing 10. The plate member 30 may have a top, a bottom and sides. Hence, the stop member 65*a* is placed on the side of the plate member 30. The stop member 65*a* may be affixed by any suitable means. For example, it may be welded onto the surface or, in a preferred embodiment, a hole in the side of the plate member 30 may receive such a stop member 65*a*. A portion of the stop member 65*a* may protrude from the side surface of the stop member 65*a* to act as an obstacle in limiting the range of movement of the plate member 30.

The stop member 65*a* acts as the guiding and limiting constraint for the plate member 30. In an embodiment, the stop member 65*a* may have a threaded portion for insertion and screwing into the sides of the plate member 30 through the slots 65*b* of the first casing 10. The unthreaded portion of each stop member 65*a* (the protruded portion) will be sliding within the slots of the first casing 10 to provide a smooth linear motion. A small narrow trench is cut into the end of the unthreaded portion of the stop member 65*a* to allow the use of a flat head screwdriver for screwing it in and tightening it up and vice versa when removing them.

Figure 3A:
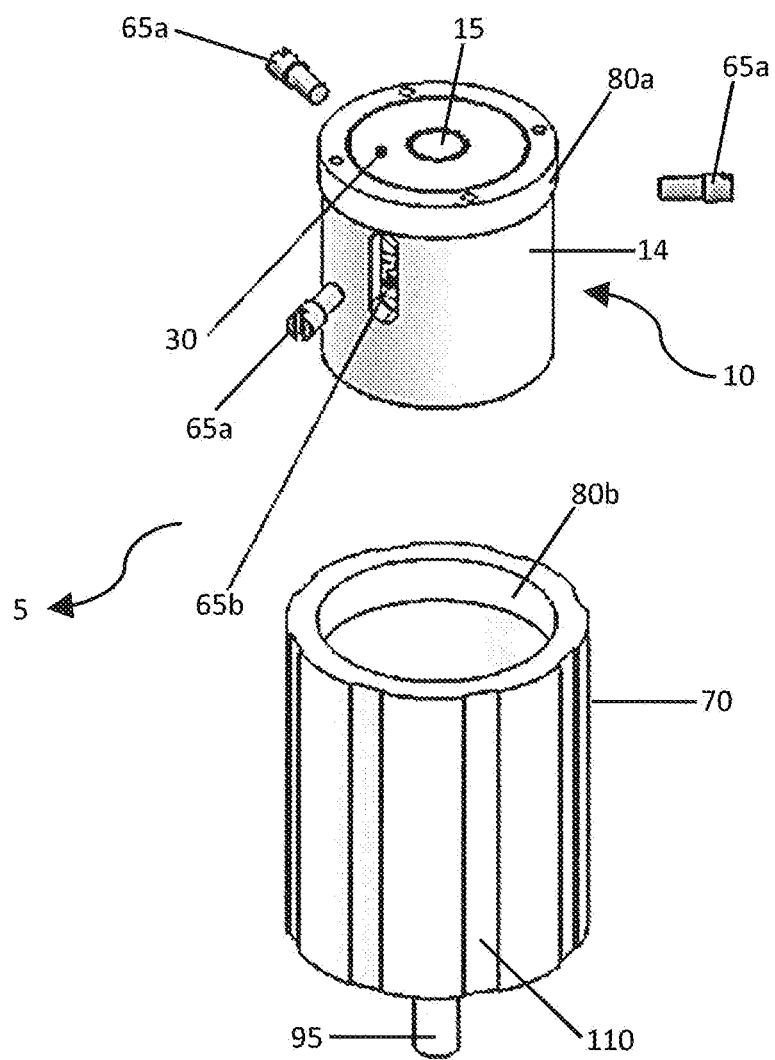
FIGS. 3a and 3b are exploded views of a grounding device according to an embodiment of the present invention.

The protruded stop member 65*a* may be accommodated by a slot 65*b* in the wall 14 of the first casing 10. By "slot", it is meant to refer to any opening in the wall 14 of the first casing 10 to accommodate the protruded stop member 65*a*. Otherwise, there would be no space to accommodate the protruded stop member 65*a* since the side of the plate member 30 is just next to, or adjacent, the interior wall surface of the first casing 10. The slot 65*b* has a length that is parallel to the longitudinal length of the pin 15, allowing the plate member 30 to move in a vertical smooth linear motion. The slot 65*b* has a higher limit and a lower limit—the higher limit may be nearer or adjacent the top of the wall 14 further away from the base 12 of the first casing 10, and the lower limit may be nearer or adjacent the bottom of the wall 14 near the base 12 of the first casing 10. As such, movement of the plate member 30 along the longitudinal length of the pin 15 is limited by the length of the slot 65*b*, i.e. a position between the higher and lower limits of the slot 65*b*. The length of the slot 65*b* determines the maximum and minimum position of the plate member 30 with respect to the first casing 10. In an embodiment, the length of the slot 65*b* is shorter than the longitudinal length of the pin 15. There can be any suitable number of stopper assemblies 65*a, b*. In a particular embodiment, as shown in FIG. 3*a*, there are 3 equally spaced apart stopper assemblies 65*a, b*. More particular, in an embodiment where the first casing 10 is annular in shape, the 3 equally spaced apart stopper assemblies 65*a, b* are placed at 120° from each other. In an embodiment, the slot 65*b* may be 8 mm in width and 20 mm in length.

The first 10 and second 70 casing may be dimensioned to any suitable size to accommodate a typical earth grounding cable 60 and clamp jaws 55.

In another embodiment of the present invention, there is provided a second outer casing 70. As with the first inner casing 10, the second outer casing 70 also has an open top and it houses the first casing 10. Both first 10 and second 70 casings are made of an electrically conductive material to provide good electrical conductivity between the first 10 and second 70 casings so that electricity can be discharge from the first casing 10 via the pin 15 to the second casing 70. In particular, the first 10 and second 70 casings are electrically conductive with very low resistance when it is attached together and the electrical current would flow through the two casings at areas of good contact.

The second casing 70 may be made from LG2 Gun Metal material which offers good corrosion resistance, strength and electrical conductivity, and is designed to be a permanent fixture in the concrete ground with splines cut into the external surface to lock it in place when the wet concrete cures and hardens.

The first casing 10 may be removably attached to the second casing 70. In order to enhance and guide attachment between the two casings, the interior surface of the base of the second casing 70 includes a pit 75 for mating with the boss 65 of the first casing 10. Naturally, the boss 65 and pit 75 are formed such that these two features would match and mate in order to provide a snug fit of the first 10 and second 70 casings.

Figure 6A:
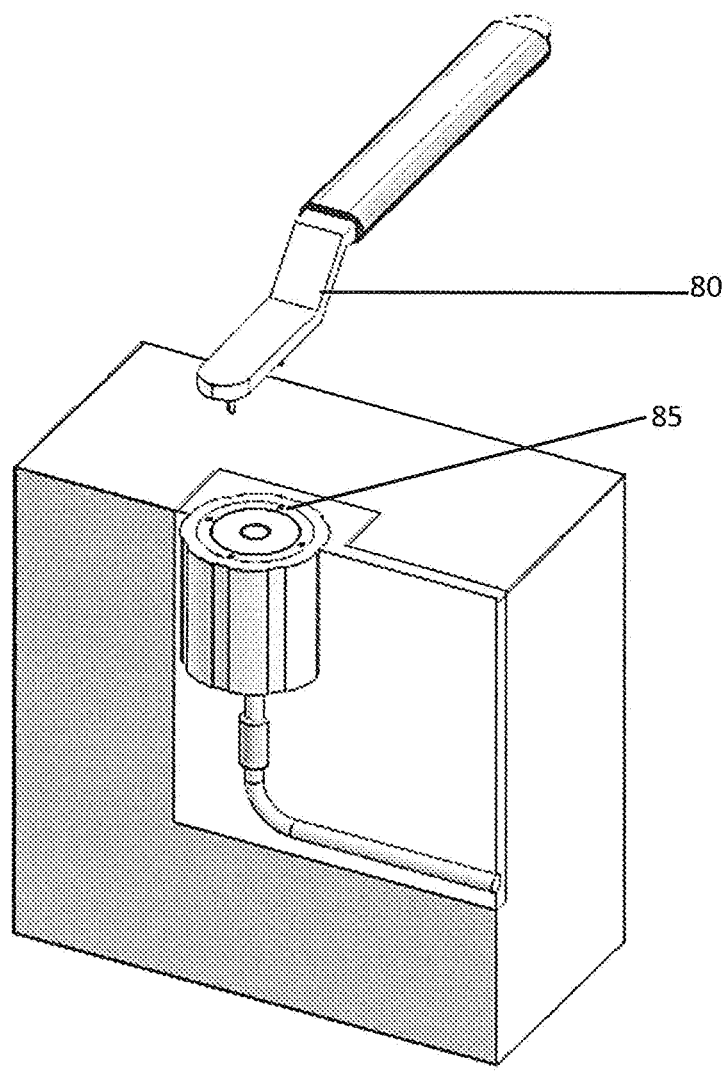
FIGS. 6a-c show the attachment and removal of the first casing of and from the second casing of a grounding device according to an embodiment of the present invention.
Figure 6B:
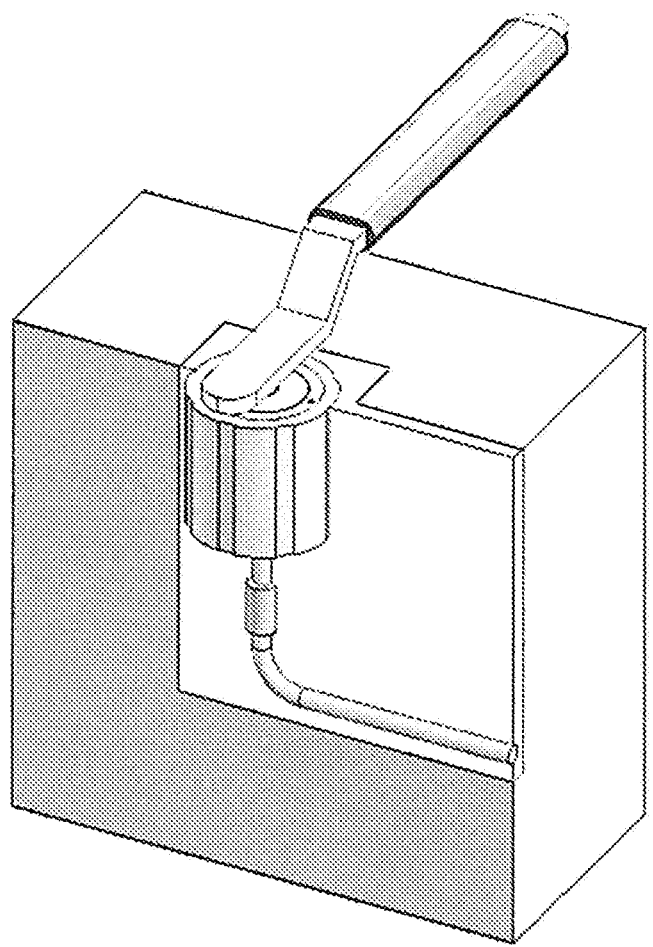
Figure 6C:
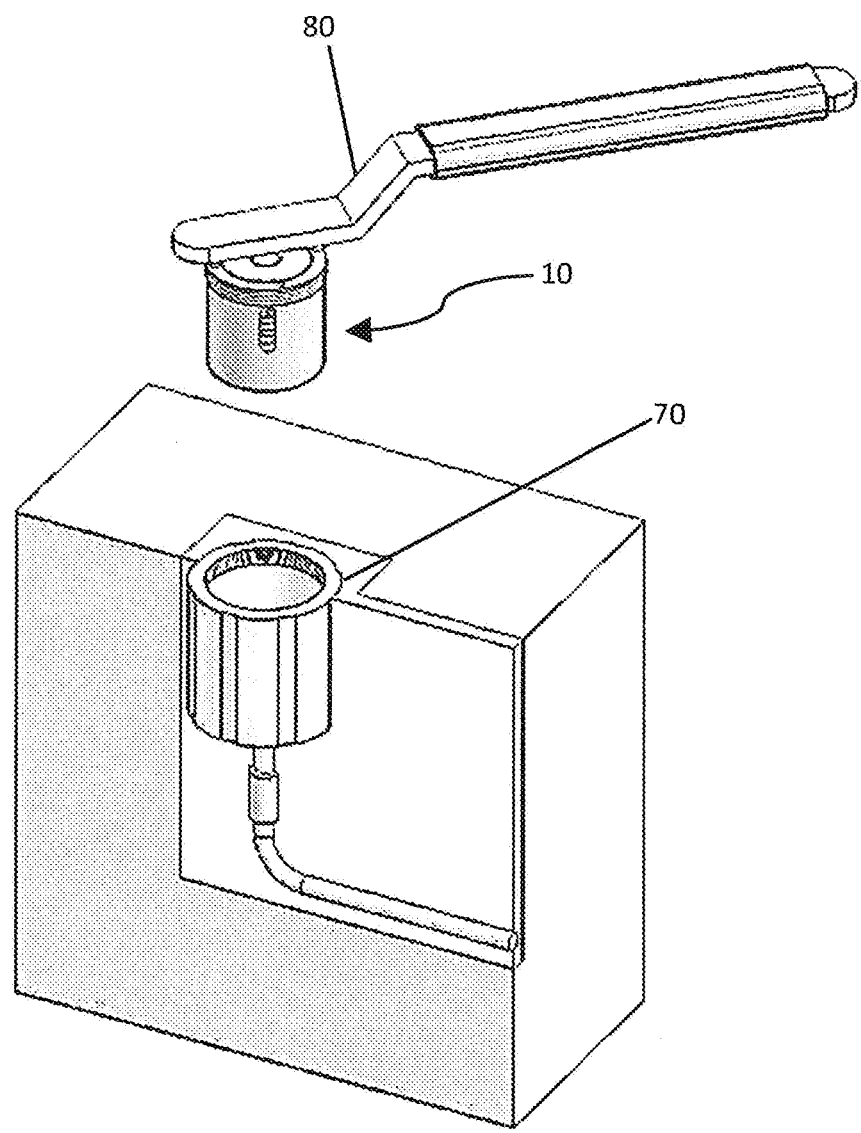

In the embodiment where the first 10 and second 70 casings are annular in shape, the attachment is achieved by a screw action, i.e. the first casing 10 may be screwed onto the second casing 70. This screw action is achieved via opposing screw threads 80*a, b* formed on the exterior surface of the first casing 10 and on the interior surface of the second casing 70. The top portion at the inner surface of the cavity in the second casing 70 is machined with metric thread lines of pitch 1.5 mm. This set of internal screw threads serve to secure the first casing 10 a corresponding set of external screw threads machined on the top portion of the outer surface of the first casing 10. As can be seen in FIG. 3*a*, the screw threads 80*a, b* are positioned in a topmost portion of the device 5. In the case of the first casing 10, the screw thread 80*a* is position above the higher limit of the slot 65*b*. In order to aid in the screw action, i.e. either to "screw off" (remove) the first casing 10 from the second casing 70 or to "screw on" (attach) the first casing 10 to the second casing 70, at least one hole 85 is disposed on the top of the wall 14 of the first casing 10 for engaging with a tool 80. This action and the tool is shown in FIGS. 6*a* to 6*c*. By "hole", it is meant to refer to any groove, recess, notch or any female member or the like for engaging or mating with a tool that may include any protrusions or male member or the like. It is understood that there can be any number of holes on the first casing 10 and the corresponding protrusions on the tool for easy handling.

In order words, to secure the first casing 10 in the second casing 70, simply sit the first casing 10 perpendicularly into the cavity of the second casing 70 and mate the screw threads accordingly. Once the threads are properly mated, insert the hardened pin tips of the special tool 80 into the top surface holes 85 of the first casing 10 and turn the handle of the tool in the clockwise direction until the entire first casing sits tightly inside the second casing 70. The handle of the special tool may be of any suitable length to provide sufficient torque in tightening and loosening of the first casing 10 with respect to the second casing 70. To remove the first casing 10 from the second casing, simply insert the hardened pin tips into the same set of surface holes 85 again and turn in the counterclockwise direction until it is fully unscrewed.

As such, advantageously, the device 5 includes a first inner casing 10 that can be removed from a permanently sunk-in (and encased by concrete) second outer casing 70. This allows the first casing 10 containing the biasing member 40, moving plate member 30 and pin 15 to be removed for repairs and servicing without having to break the concrete hard ground.

The exterior surface of the base of the second casing 70 may be adapted with any means for providing or receiving a connection to an earth grounding network. In an embodiment, such means includes an opening 90 for receiving an electrically conductive material that connects to or is part of the earth grounding network. Such means may be coupled to the underground earth mesh or grounding strip by an exothermic joint. The exothermic joint or cad weld is normally formed with the use of a crucible together with the ignition of various chemicals held by it. The opening 90 may have an internal screw thread allowing part of the earth grounding network (e.g. a cable, wire, rod, pipe or the like 95) to be attached via a screw action. This can be seen in FIG. 7b.

Figure 7A:
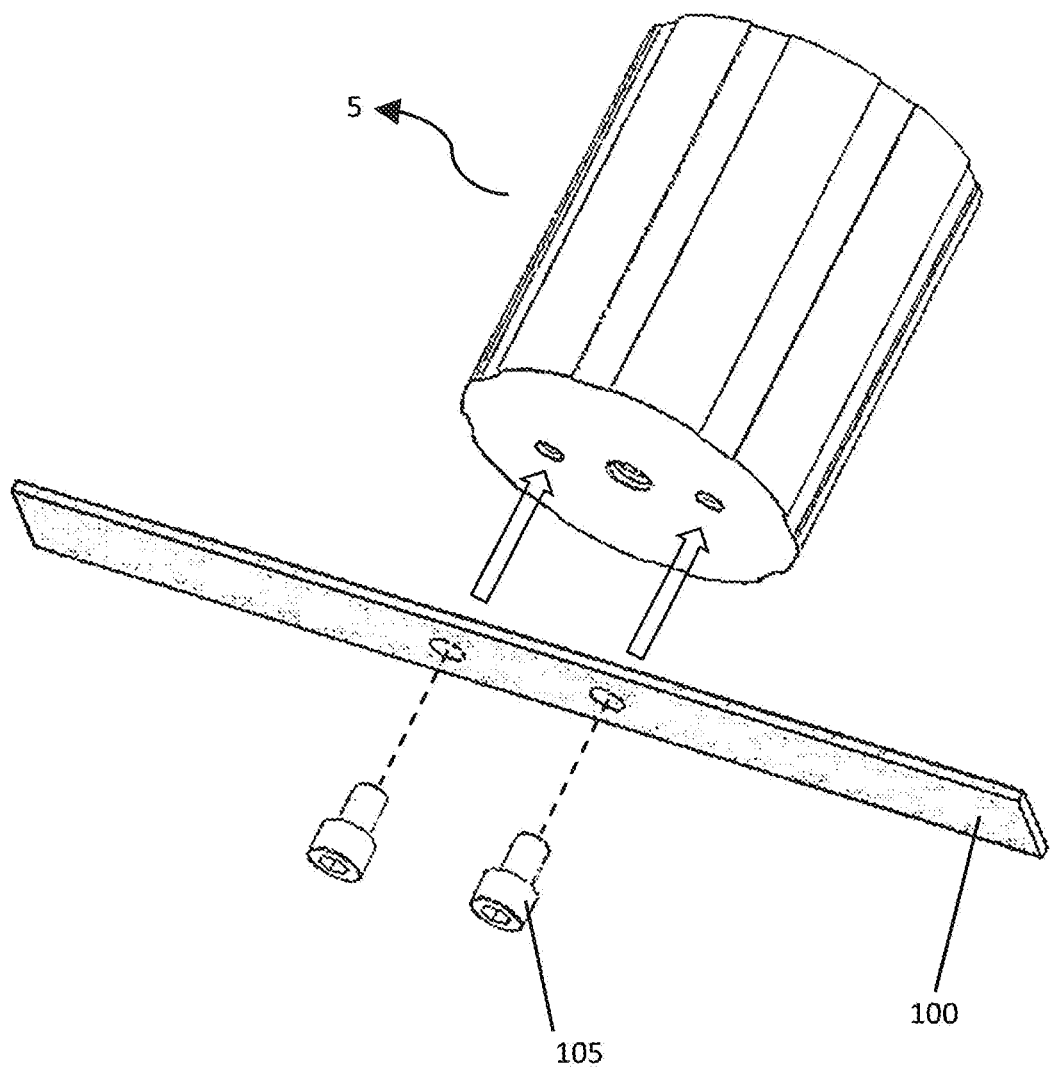
FIGS. 7a and 7b show the attachment means for attaching a grounding device according to an embodiment of the present invention to an earth ground network.
Figure 7B:
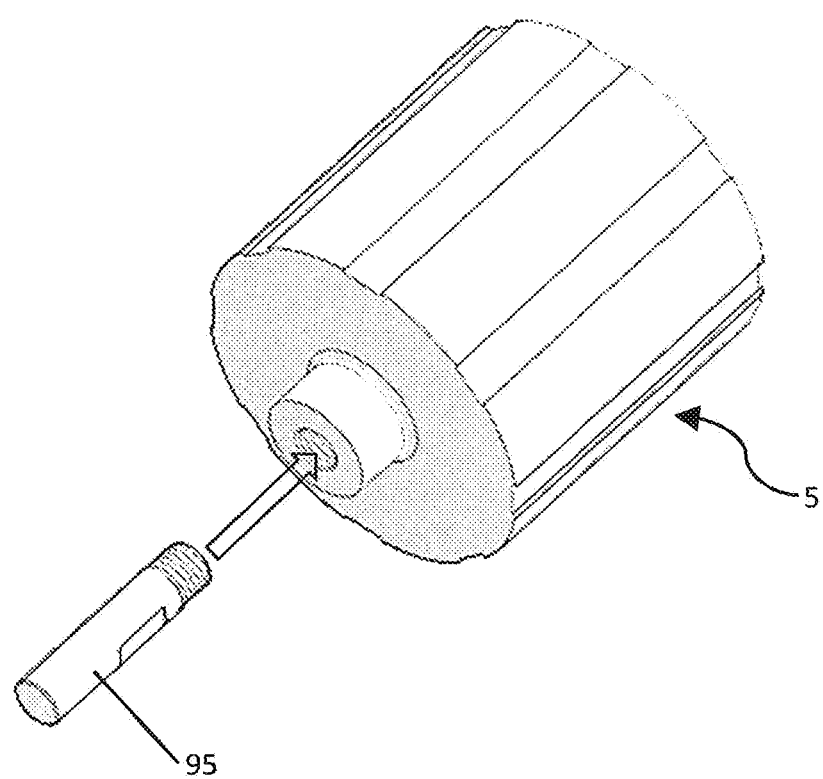

In an alternative embodiment, the exterior surface of the base of the second casing 70 includes a tail for conducting an electrical charge to an earth grounding network. Still further, as shown in FIG. 7a the exterior surface of the base of the second casing 70 may include at least one attachment means 105 for attaching the device to a grounding plate 100. For example, any such grounding plate 100 may be made of copper tape.

In addition to the above, the exterior surface of second casing 70 further comprising splines 110.

Figure 3B:
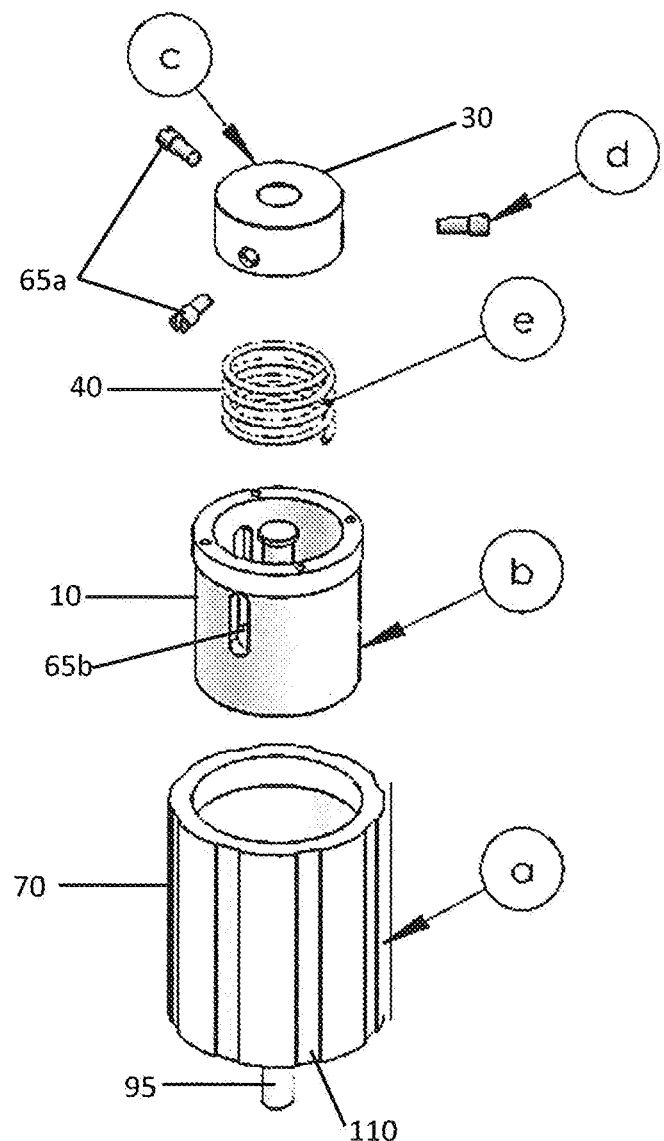

FIG. 3b shows an exploded view of the device 5 and is useful for understanding the various components of the device. The second outer casing 70 (a) houses the first inner casing 10 (b) which may be integral with the pin 15. The biasing member 40 is housed within the cavity of the first casing 10 (e), and the plate member 30 sits on top of the biasing member 40 (c). The stop member 65a (d) is inserted into holes in the plate member through slots 65b in the wall of the first casing 10.

Figure 4A:
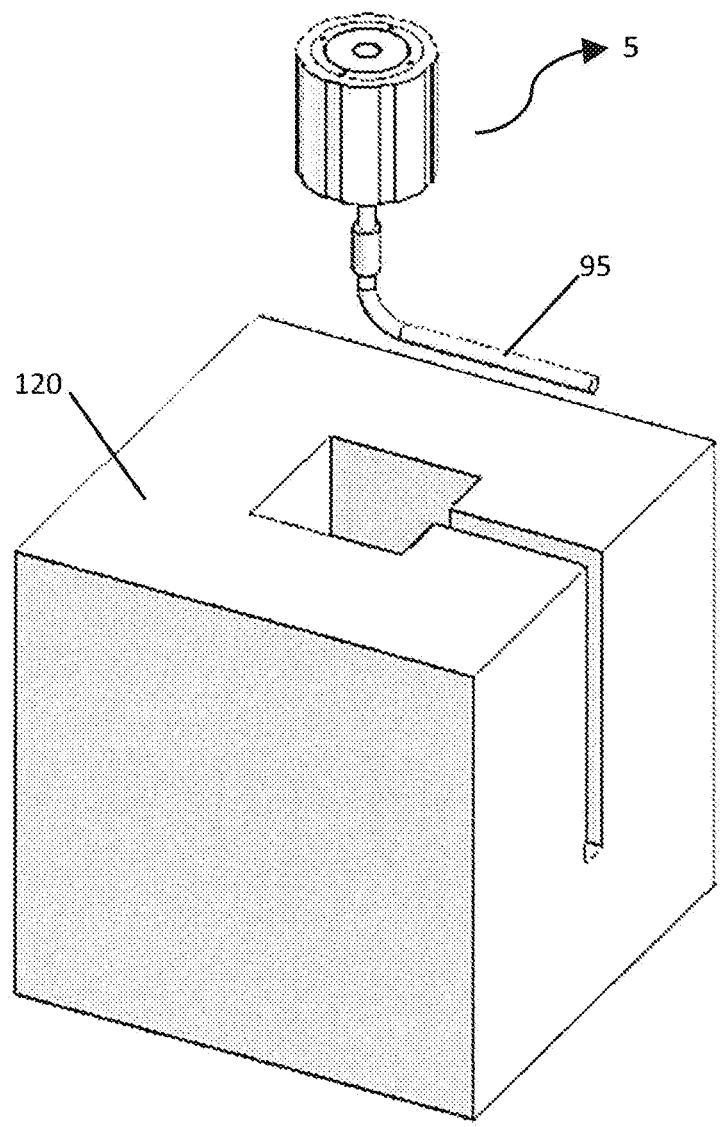
FIGS. 4a-d show the installation of a grounding device according to an embodiment of the present invention.
Figure 4B:
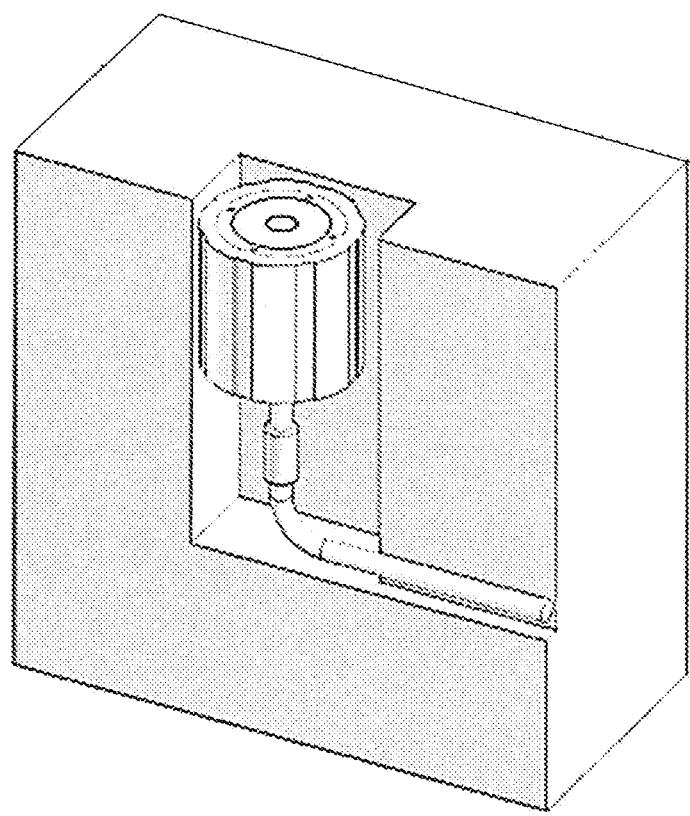
Figure 4C:
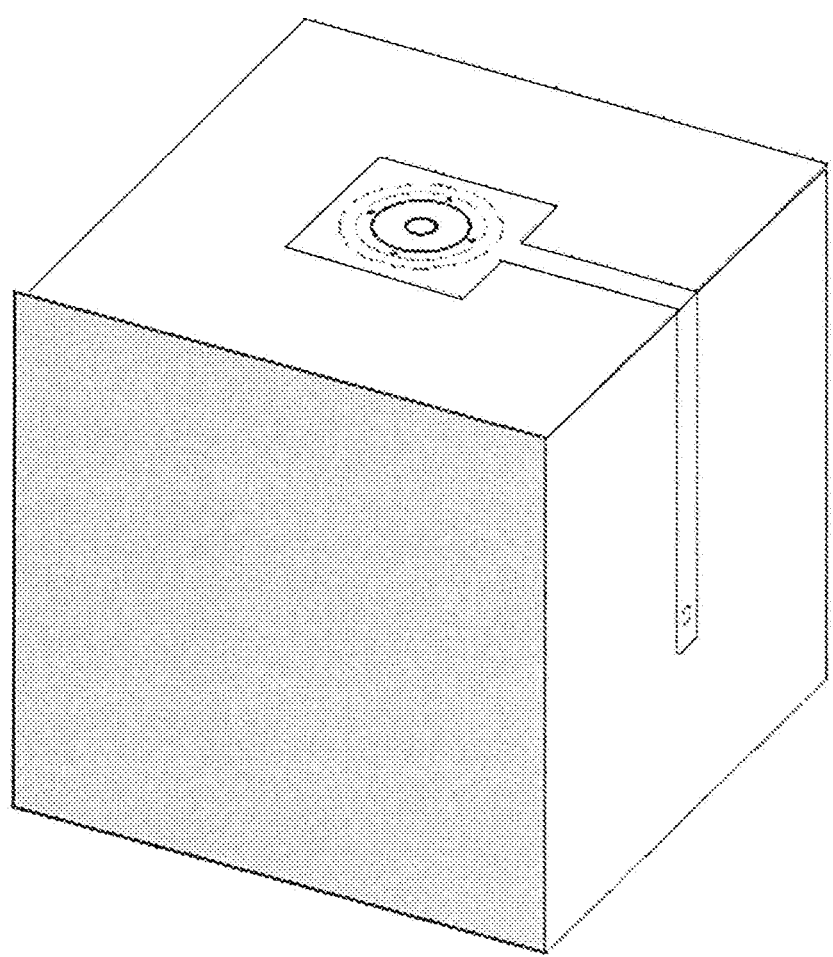
Figure 4D:
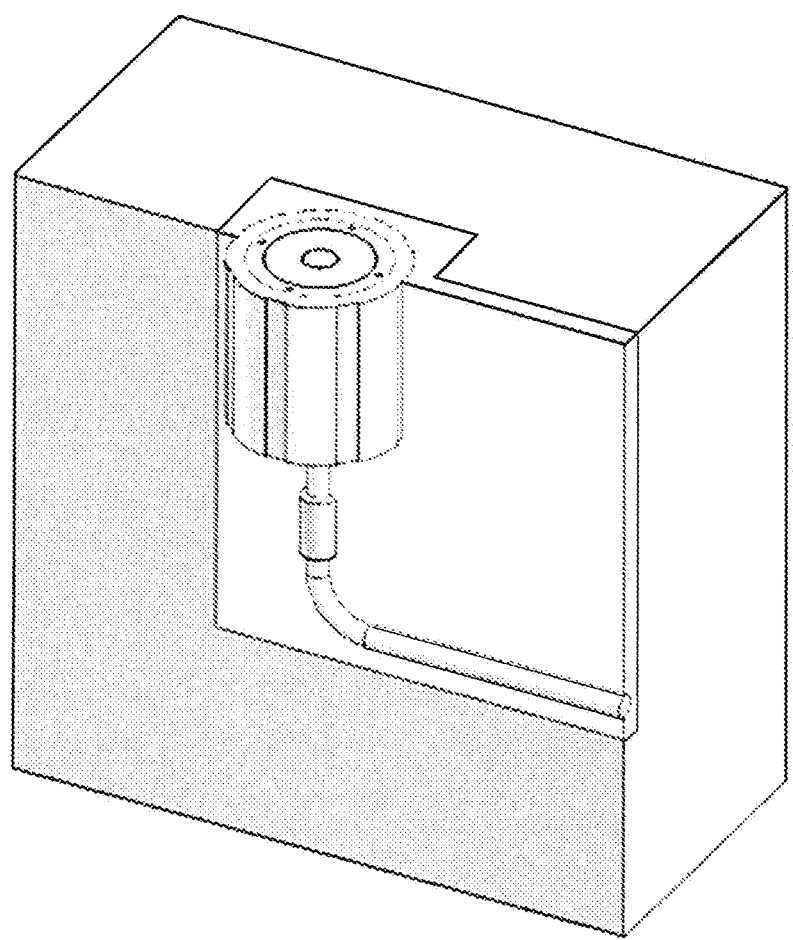
Figure 5A:
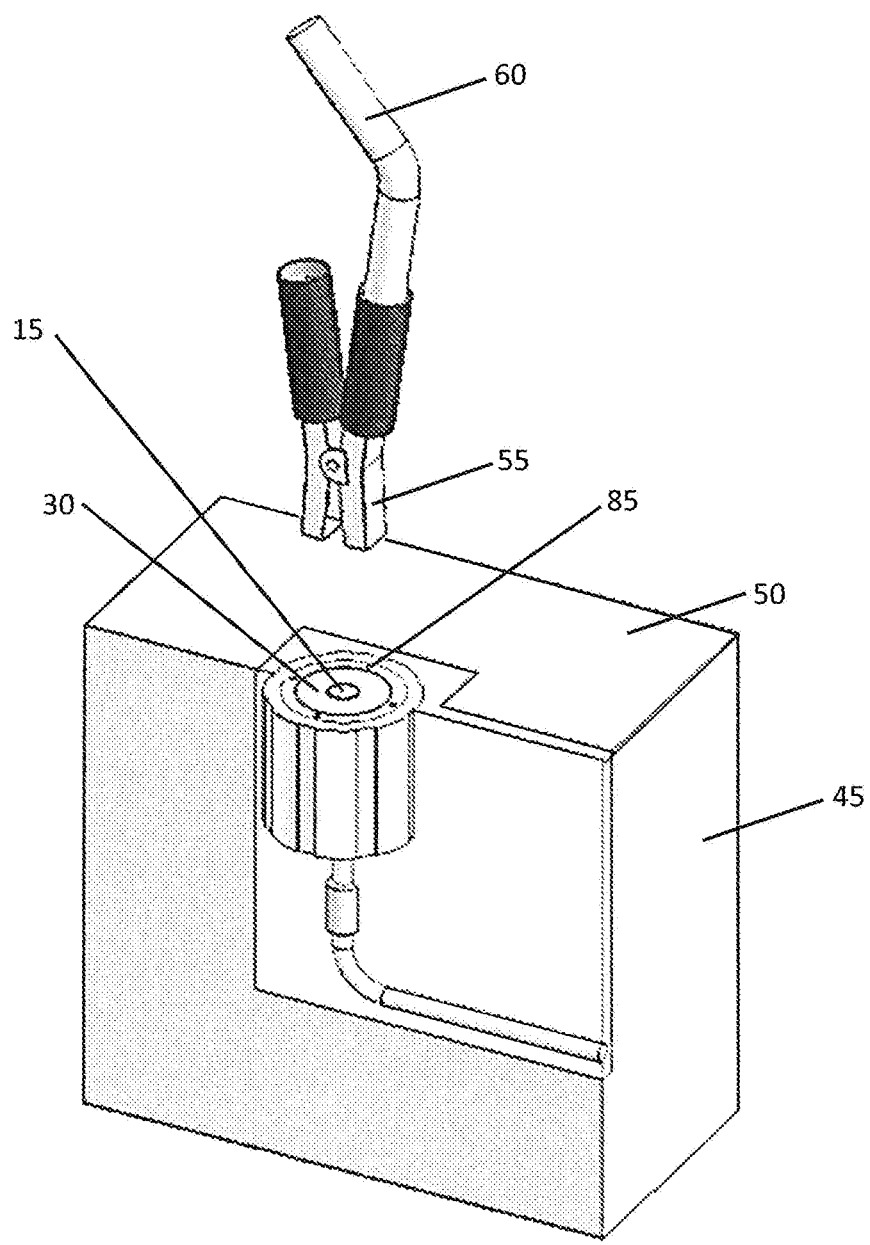
FIGS. 5a-d show a grounding device according to an embodiment of the present invention when in use with a clamp.
Figure 5B:
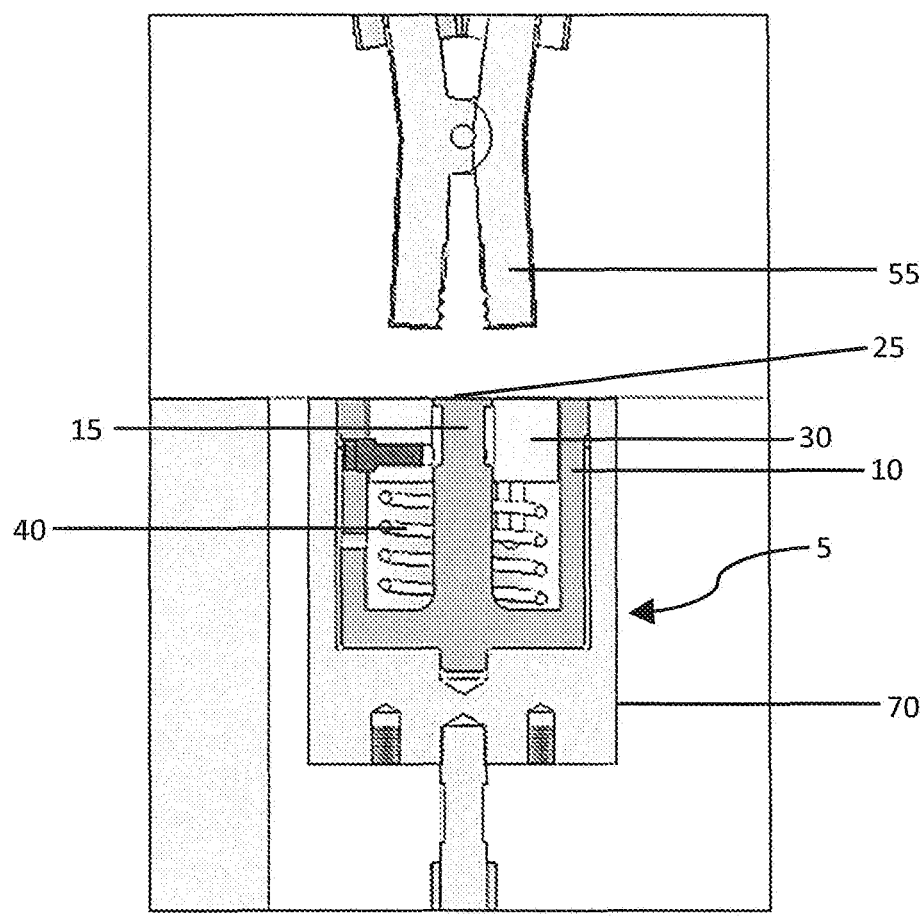
Figure 5C:
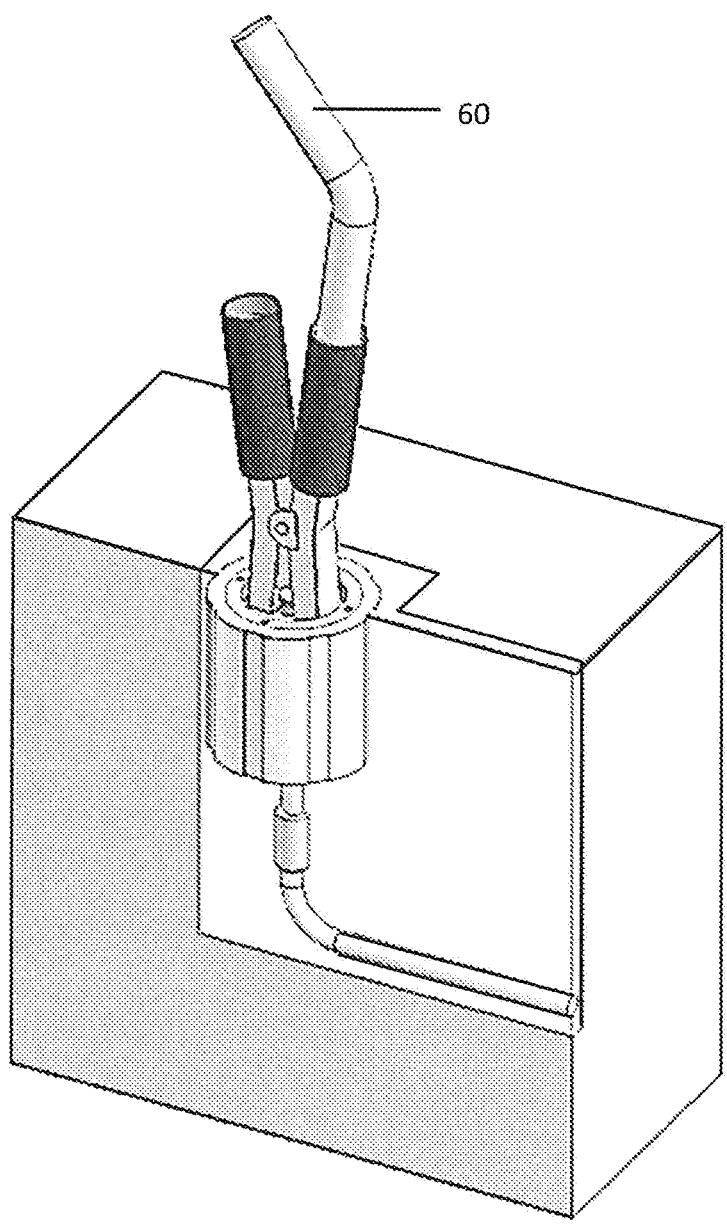
Figure 5D:
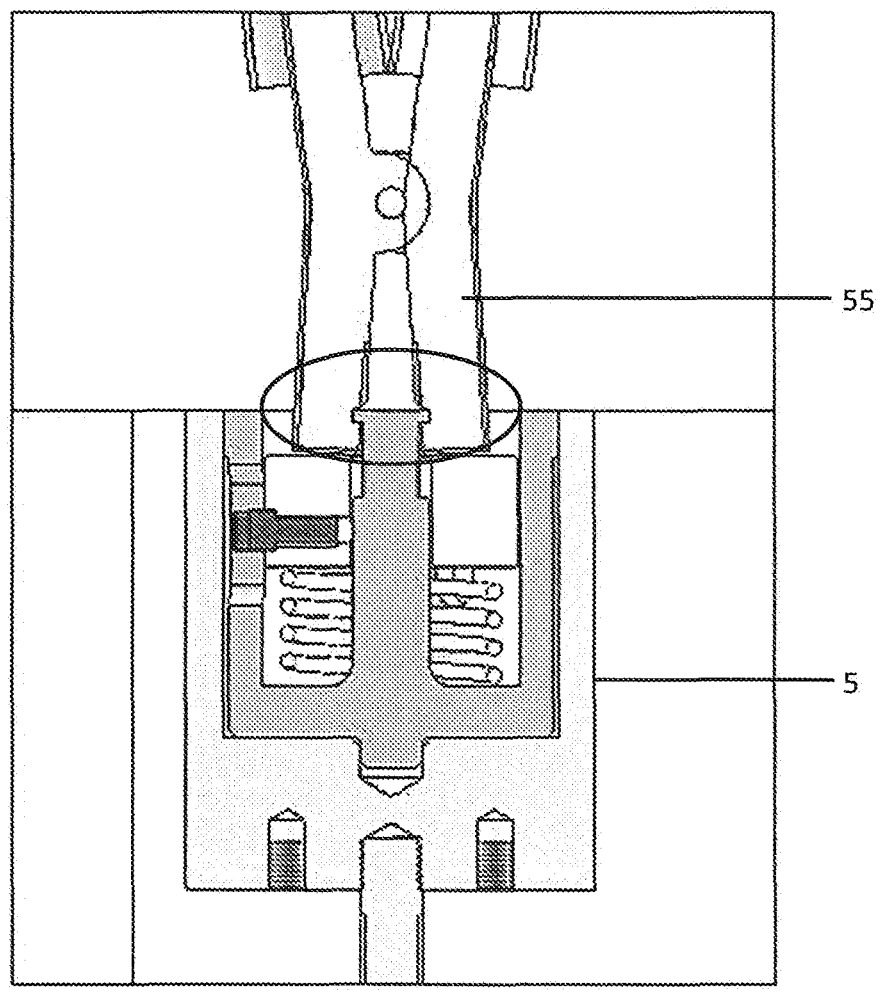

FIGS. 4a-d show how the device 5 may be installed into the ground 120 in sequence. Once the device 5 is placed in a cavity in the ground 120 (FIG. 4b), new wet concrete is poured into the cavity to encapsulate the device 5 (FIG. 4c). The new concrete will harden after a curing process and will hold onto the device 5 firmly into the ground 120 (FIG. 4d). The splines 110 of the second casing 70 engages with the cured concrete. The device 5 is ready for use.

Whilst there has been described in the foregoing description preferred embodiments of the present invention, it will be understood by those skilled in the technology concerned that many variations or modifications in details of design or construction may be made without departing from the present invention.

The invention claimed is:

1. A grounding device comprising:
 (a) a first casing having an open top;
 (b) a pin extending from the base of and within the first casing, the pin made from an electrically conductive material and having a longitudinal length with opposite first and second ends, the second end of the pin in contact with and integral with the base of the first casing;
 (c) a plate member having an opening to allow the plate member to move along the longitudinal length of the pin between a first position and a second position, the plate member and the first casing form a cavity within the first casing; and
 (d) a biasing member disposed within the cavity and attached to the plate member for biasing the plate member in the first position,
 wherein the first position conceals the longitudinal length of the pin within the cavity and the second position is any position that exposes a portion of the longitudinal length of the pin, and wherein the pin and the first casing are integrally formed from the same electrically conductive material.

2. The device according to claim 1, further comprising a stopper assembly for limiting the range of movement of the plate member.

3. The device according to claim 2, wherein the stopper assembly comprises:
 (a) a stop member attached to the surface of the plate member facing the interior wall of the first casing, a portion of the stop member protrudes from the surface; and
 (b) a slot in the wall of the first casing for accommodating the protruded stop member, the slot having a length parallel to the longitudinal length of the pin;
 wherein movement of the plate member along the longitudinal length of the pin is limited by the length of the slot.

4. The device according to claim 3, wherein the length of the slot is shorter than the longitudinal length of the pin.

5. The device according to claim 3, wherein the device comprises 3 equally spaced apart stopper assemblies.

6. The device according to claim 1, wherein the pin further comprises a notch positioned at the first end for receiving a pair of jaws of a clamp.

7. The device according to claim 1, wherein the biasing member is a spring mechanism.

8. The device according to claim 1, wherein the exterior surface of the base of the first casing further comprises a boss for providing an electrical connection with an electrical conducting material.

9. The device according to claim 1, further comprising a second casing, the second casing having an open top for housing the first casing, the first and second casings made of an electrically conductive material to provide good electrical conductivity between the first and second casings.

10. The device according to claim 9, wherein the interior surface of the base of the second casing further comprises a pit for mating with the boss of the first casing.

11. The device according to claim 9, wherein the exterior surface of the base of the second casing further comprises an opening configured for receiving a connection to an earth grounding network.

12. The device according to claim 9, wherein the exterior surface of the base of the second casing further comprises a tail for conducting an electrical charge to an earth grounding network.

13. The device according to claim 9, wherein the second casing is fixed into a structure and the first casing is removably attached to the second casing.

14. The device according to claim 13, wherein the first and second casings are annular and are removably attached to each other by a screw action via opposing screw threads on the exterior surface of the first casing and on the interior surface of the second casing.

15. The device according to claim 13, wherein the top of the wall of the first casing further comprises at least one hole for engaging with a tool for attaching the first casing to the second casing or removing the first casing from the second casing.

16. The device according to claim 9, wherein the exterior surface of the second casing further comprises splines.

17. The device according to claim 9, wherein the exterior surface of the base of the second casing further comprises at least one attachment means for attaching the device to a grounding plate.

18. A ground system, comprising the grounding device of claim 1 connected to an earth grounding network.

* * * * *